H. C. ROBINSON.
SHOCK ABSORBER FOR AUTOMOBILES.
APPLICATION FILED APR. 17, 1920.

1,378,279.

Patented May 17, 1921.

UNITED STATES PATENT OFFICE.

HENRY CULP ROBINSON, OF BEAMSVILLE, ONTARIO, CANADA.

SHOCK-ABSORBER FOR AUTOMOBILES.

1,378,279.          Specification of Letters Patent.     Patented May 17, 1921.

Application filed April 17, 1920. Serial No. 374,703.

*To all whom it may concern:*

Be it known that I, HENRY CULP ROBINSON, a subject of the King of Great Britain, residing in the town of Beamsville, county of Lincoln, Province of Ontario, Dominion of Canada, have invented certain new and useful Improvements in Shock-Absorbers for Automobiles, of which the following is the specification.

My invention relates to improvements in shock absorbers for automobiles and the object of the invention is to devise a simple and strong attachment which may be fitted to any automobile and which will co-act with the ordinary springs of the car to relieve same of a portion of the strain and which will also increase the smoothness of riding of the car.

My invention consists in mounting on the ordinary leaf spring of the automobile an opposed leaf spring of less length, both springs being suitably secured to the chassis frame, a cantaliver member secured at one end to the axle, the free end of the ordinary spring being hingedly connected to the cantaliver member intermediately of its length and a link member connecting the free ends of the opposed leaf spring and the cantaliver member, all as more particularly described and illustrated in the accompanying drawings in which:—

Figure 1 is a side elevation of my invention as fitted to one type of automobile spring.

Fig. 2 is a plan view thereof with the upper opposed spring and chassis frame removed for clearness.

Fig. 3 is a sectional elevation on the line 3, 3 of Fig. 1.

Fig. 4 is a section on the line 4, 4 of Fig. 1, omitting the chassis frame.

Fig. 5 is a section on the line 5, 5 of Fig. 1 and Fig. 2.

Like characters of reference indicate corresponding parts in the various views.

1 is the chassis frame.

2 the axle and 3 the ordinary spring of the car.

4 is an opposed spring which is mounted on the ordinary spring 3. Both these springs are secured to the frame 1 by means of the bolt 5 which passes through both springs and the bracket 6, and by the bolts 8 extending on each side of the springs and through the bracket 6 and the clip 9.

The bracket 6 is secured to the frame 1 by the rivets 7.

10 is a sleeve mounted on the axle having the flanged portion 11.

12 is a rigid cantaliver member one end of which is secured to the flanged portion 11 by means of the bolt 13 and the clip 14, the depending ends of this clip engaging notches in the portion 12 and extending through orifices in the flange 11. 15 are nuts engaging the threaded ends of the clip 14.

The free end of the cantaliver is bent back upon itself to form a bearing orifice 16.

17 are L-shaped bolts one end of each being threaded as at 18 and the other end formed into an eye 19 through which the threaded end of the other bolt is adapted to extend. 20 are nuts.

The free end of the spring 4 is bent back upon itself to form a bearing orifice 21.

The horizontal arms of the L-shaped bolts 17 extend through the orifices 16 and 21 and when the nuts 20 are tightened these two bolts form a link connecting the free ends of the spring 4 and the cantaliver 12.

22 are upwardly extending flanges carried by the cantaliver 12 and having registering orifices therein.

The free end of the spring 3 is bent back upon itself to form a bearing orifice 23.

24 is a bolt extending through the orifices in the flanges 22 and the bearing orifice 23 in the spring 3 and forms a hinge connection between the free end of this spring and the cantaliver member 12.

The flanges 22 are extended in length as at 25 and serve to hold the lower leaves of the spring 3 against lateral displacement.

The construction and operation of my device is as follows:—

The opposed spring 4 is mounted above the ordinary car spring 3 and is of shorter length.

The cantaliver member 12 is secured to the sleeve 11 by the clip 14 and bolt 13 and the free end of the spring 3 is connected to the cantaliver intermediately of its length by means of the bolt 24.

The free ends of the cantaliver 12 and of the opposed spring 4, which lie vertically opposite each other, are connected by the bolts 17. Any suitable method of lubricating the bearing surfaces of the bolts 17 and 24 may be used.

It will be seen that the spring 4 and the cantaliver member 12 connected as described will co-act with the ordinary spring 3 to form a compound cantaliver spring structure which will greatly relieve the strain on the ordinary spring 3 and due to the method of hingedly connecting the ordinary spring to the cantaliver intermediately of its length there will be oscillation of the member 12 about this hinge connection. In this way the spring suspension of the car as a whole will have much greater resiliency and shocks will be absorbed efficiently by the action of the cantaliver 12 and the spring 4 with little if any, effect upon the ordinary spring 3.

The action will in fact be of a rocking nature about the hinge connection 24.

From the foregoing it will be seen that I have devised improvements in shock absorbers for automobiles which will greatly increase the resiliency of the spring suspension and will result in smoother riding of the car.

Many modifications may be made in my invention without departing from the spirit of the same or the scope of the claims and the form shown is to be taken as illustrative and not in a limiting sense.

For instance while I have shown my invention as applied to a single cantaliver spring it can of course be applied to any type of spring. Also it may be applied to either the front or rear springs of a car.

What I claim as my invention is:

1. In an automobile, the combination with the axle, the frame and the spring connected to the frame, of a rigid member mounted at one end upon the axle and having its other end resiliently connected to the frame, the free end of the spring being hingedly connected to the upper end of the rigid member intermediately of its length.

2. In an automobile, the combination with the axle, the frame and the ordinary springs of the automobile connected to the frame, of an opposed spring mounted upon the ordinary spring, a rigid member hingedly connected intermediately of its length to the free end of the ordinary spring, the rigid member being mounted at one end upon the axle and a link connecting the other end of the rigid member to the free end of the opposed spring.

3. In an automobile, the combination with the axle, the frame and the ordinary springs of the automobile connected to the frame, of an opposed spring mounted upon the ordinary spring, a rigid member hingedly connected intermediately of its length to the free end of the ordinary spring, the rigid member being mounted at one end upon the axle, a link connecting the other end of the rigid member to the free end of the opposed spring and means for preventing lateral displacement of the springs.

4. In an automobile, the combination with the axle, the frame and the ordinary springs thereof connected to the frame, of an opposed spring mounted upon the ordinary spring, a rigid cantaliver hingedly connected intermediately of its length to the free end of the ordinary spring, the cantaliver being mounted at one end upon the axle, and a link connecting the other end of the cantaliver to the free end of the opposed spring.

5. In an automobile, the combination with the axle, the frame and the ordinary springs thereof connected to the frame, of an opposed spring mounted upon the ordinary spring, a rigid cantaliver hingedly connected intermediately of its length to the free end of the ordinary spring, the cantaliver being mounted at one end upon the axle, a link connecting the other end of the cantaliver to the free end of the opposed spring and means for preventing lateral displacement of the springs.

6. In an automobile, the combination with the axle, the frame and the ordinary springs thereof connected to the frame, of an opposed spring of shorter length mounted upon the ordinary spring, a rigid cantaliver hingedly connected intermediately of its length to the free end of the ordinary spring, the cantaliver being mounted at one end upon the axle and a link connecting the other end of the cantaliver to the free end of the opposed spring.

7. In an automobile, the combination with the axle, the frame and the ordinary springs thereof connected to the frame, of an opposed spring of shorter length, mounted above the ordinary spring, a rigid cantaliver mounted at one end upon the axle, a link connecting the free ends of the opposed spring and cantaliver, the free end of the ordinary spring, being hingedly mounted on the upper side of the cantaliver and intermediately of its length.

8. In an automobile, the combination with the axle, the frame and the ordinary springs thereof connected to the frame, of an opposed spring of shorter length, mounted above the ordinary spring, a rigid cantaliver mounted at one end upon the axle, a link connecting the free ends of the opposed spring and cantaliver, the free end of the ordinary spring being hingedly mounted on the upper side of the cantaliver and intermediately of its length and means for preventing lateral displacement of the springs.

9. In an automobile, the combination with the axle, the frame and the ordinary leaf springs thereof connected to the frame, of an opposed leaf spring mounted above the ordinary spring and being of shorter length, a cantaliver mounted at one end upon the axle, the free ends of the opposed spring and cantaliver being provided with bearing orifices, a link engaging the aforesaid orifices and connecting the opposed spring and cantaliver, upwardly extending lugs carried at the upper face of the cantaliver intermediately of its length, the free end of the ordinary spring provided with a bearing orifice, and a bolt extending through orifices in the lugs and the said bearing orifice in the ordinary spring.

10. In an automobile having a frame, axle and the ordinary springs, a rigid cantaliver mounted at one end upon the axle and having its other end resiliently connected to the frame of the automobile, lugs extending upwardly from the sides of the cantaliver intermediately of its length and having registering orifices therein, the free end of the ordinary spring of the automobile lying between the lugs and being provided with a bearing orifice, and a journal bolt extending through the orifices in the lugs and the said bearing orifice in the spring.

11. In an automobile having the frame, axle and the ordinary springs, a rigid cantaliver mounted at one end upon the axle and having its other end resiliently connected to the frame of the automobile, the ordinary spring of the automobile having its free end hingedly mounted upon the cantaliver intermediately of its length and means formed integrally with the cantaliver for preventing lateral displacement of the leaves of the ordinary spring.

HENRY CULP ROBINSON.

Witnesses:
JOHN G. HAYNARD,
NORMEN COLES.